United States Patent [19]
Harrington

[11] Patent Number: 6,021,372
[45] Date of Patent: Feb. 1, 2000

[54] SYSTEM AND METHOD FOR CALCULATING A BEST-ROUTE

[75] Inventor: Paul Sean Harrington, Seattle, Wash.

[73] Assignee: Microsoft Corporation, Redmond, Wash.

[21] Appl. No.: 08/910,952

[22] Filed: Aug. 8, 1997

[51] Int. Cl.$^7$ .................................................. G06F 165/00
[52] U.S. Cl. ........................ 701/209; 701/201; 701/210
[58] Field of Search .................... 701/201, 202, 701/208, 209, 210, 200; 340/990, 995

[56] References Cited

U.S. PATENT DOCUMENTS

| | | | |
|---|---|---|---|
| 4,962,458 | 10/1990 | Verstraete | 701/200 |
| 5,608,635 | 3/1997 | Tamai | 701/209 |

OTHER PUBLICATIONS

Sedgewick, Robert, *Algorithms in C*, Addison–Wesley Publishing Company, Dec. 1990, Chapters 31–32, pp. 451–484.

*Primary Examiner*—Tan Nguyen
*Attorney, Agent, or Firm*—Jones & Askew, LLP

[57] ABSTRACT

In a computer having a multithreaded operating system, a road-mapping program begins a best-route calculation in the background such that much of the calculation is completed before the user finishes providing inputs. In this manner, the user's perceived calculation time is shortened. The user is allowed to input any of a number of variables related to the best-route calculation. The calculation can be initiated without all of the variables necessary to finish it. The calculation is initiated upon the receipt of a predetermined variable, and predicts values for the unreceived variables. As each variable is received, the invention confirms that the predicted value for that variable is confirmed as correct. If the predicted value is incorrect, the calculation is restarted based on the actual value of that variable, in combination with predictions for the variables which have still not been received.

22 Claims, 9 Drawing Sheets

SYSTEM AND METHOD FOR CALCULATING A BEST-ROUTE

TECHNICAL FIELD

The present invention relates to computerized road-mapping products, and more particularly relates to calculating a best route between two points on a computerized map in an efficient manner which gives the user the impression of a reduced calculation period.

BACKGROUND OF THE INVENTION

Available today are computer programs known as "road-mapping" programs. Those programs provide digital maps, often complete with detailed road networks down to the city-street level. Typically, a user can input a location and the road-mapping program will display a map on-screen of the selected location. Today, road-mapping products typically include the ability to calculate a "best route" between two locations. In other words, the user can input two locations, and the road-mapping program will compute the travel directions from the first location to the second location. The directions are typically based on certain user preferences, such as a speed at which the user likes to drive, or the degree of scenery along the route. However, road-mapping programs currently available suffer from significant shortcomings, one of which is the best-route calculation time during which the user must wait.

An algorithm typically used to calculate the optimum (or "best") route between two points in a road network is a variant of a well-known algorithm generally attributed to E. Dijkstra. The computationally intensive part of the algorithm involves calculating a Shortest-Path Spanning Tree ("SPST") for a given point in the road network. Once the SPST has been created, it can be used to quickly generate the shortest path from that point to any other point in the road network. Note that in this sense "shortest" really means "least cost" because each road is assigned a cost or weight not necessarily directly related to the road length. By varying the way the cost is calculated for each road, SPSTs can be generated for the quickest, shortest, or preferred routes.

Each point in the road network can have several corresponding SPSTs. Each road (or "link") in the network can have a different cost, depending on user-defined variables such as the speed at which the user likes to drive. These variables can be generally described as a "driving profile" or a "route type." Accordingly, a single location can have several corresponding SPSTs. Each SPST will provide the best route to any other point in the road network for each set of user-defined variables.

Existing road-mapping programs typically do not begin calculating the best route until after the user has provided all relevant inputs. This is because to complete the calculation, all the user's inputs are required, including the start point, the end point, and the desired route type. In addition, calculating the SPST in the foreground prevents the user from using other features of the program until the calculation is complete. Therefore, existing programs often require that the user first input all route variables before beginning the route calculation. Then, in response to the user's final input, the calculation begins, based on the route type desired, the start point, and the end point. This method can result in a considerable wait for the user during the calculation. The program's other features are typically unavailable to the user during the calculation.

Therefore, a need exists for a system that can more quickly determine a best-route between two points. With such a system there would be less wait-time for the calculation to finish, making the user's experience in interacting with the system more enjoyable.

SUMMARY OF THE INVENTION

The present invention satisfies the above-described needs by initiating a best-route calculation before the user inputs all of the variables necessary to complete the calculation. The invention makes use of a modern multithreaded operating system to initiate the most time-consuming portion of the best-route calculation in a worker thread, or in the "background," based on a single input variable in conjunction with key predictions regarding the remaining variables.

A key to the success of the present invention is the background calculating made available by modern multithreaded operating systems, such as Microsoft Windows 95, Microsoft Windows NT, Unix, Solaris, or the like. Although calculating the best route requires at least two points, only one point is necessary to begin calculating the SPST, which is the most time consuming portion of the best-route calculation. Therefore, the present invention begins calculating the SPST in a worker thread (in the background) when the user enters the start point. The background calculation is invisible to the user. In this manner, a substantial portion of the calculation can be completed before all of the inputs are received from the user. The result is that the user perceives a substantially shorter calculation time. In other words, the user will perceive that the calculation took less time than a similar system which does not employ background calculation.

The present invention must make several key predictions when calculating the SPST. As mentioned above, the SPST is based on several factors which the user can modify. However, most users repeatedly make the same choices concerning those factors. For instance, most users choose the quickest route, rather than, for example, the most scenic or the shortest. Accordingly, the present invention begins calculating a SPST based on the factors most likely to be input by the user. By making these key predictions, the present invention begins calculating the most likely SPST before the user inputs all of the variables. If the user inputs a variable that does not accord with the predictions made, then the present invention begins a new calculation based on the new inputs, in conjunction with predictions concerning the inputs which still remain to be provided. In other words, each input the user makes either validates a prediction made, or immediately starts a new calculation with fewer predictions.

Existing road-mapping programs typically do not begin the calculation until the user's final input. Consequently, the calculation time perceived by the user for the present invention will not be any longer than a standard calculation by existing programs. Worst case, the user's final input will result in the present invention having to begin a new calculation at the same instant that the calculation would have begun with an existing program. Best case, all of the predictions hold true, and the SPST is substantially, if not wholly, complete before the user's last input. In other words, much of the best-route calculation is complete prior to the user expecting the calculation to begin. Therefore, the user perceives a shortened calculation time, even though, in reality, the entire calculation may have taken slightly longer.

It is important to note that even though a prediction may have proven false, the SPST already generated based on that prediction can be saved in case the user changes the input back to the original prediction. One skilled in the art will appreciate that this prevents having to recalculate a SPST which has already been calculated, but which proved invalid for a particular set of variables. Also, if a larger SPST than necessary has already been calculated when the user inputs the end point, the additional SPST data is not discarded in case the user changes the end point. In that case, the SPST will not need to be recalculated, but rather is simply called up from memory and applied to the new scenario. This situation will result in a near instantaneous route calculation perceived by the user.

Generally described, in one aspect, the present invention initiates a best-route calculation in a worker thread before the user inputs all variables necessary to complete the calculation. In response to a first input variable, a best-route calculation is initiated in a background worker thread based on the first input variable together with predictions for the remaining variables. In turn, the remaining variables input by the user are recognized. The best-route calculation is reinitiated if one of the subsequent input variables invalidates one of the predictions. The result of the completed best-route calculation is then output to the user in a helpful format.

In another aspect, the present invention provides a computer system for beginning a best-route calculation in a worker thread before the user inputs the variables necessary to complete the calculation. The computer system includes a processing unit, an input device connected to the processing unit, a display device connected to the processing unit for displaying a user interface, and memory connected to the processing unit and containing a program module. In response to instructions from the program module, the processing unit is operative to prompt a user for various inputs relating to a best-route calculation. In response to the input of a selected variable, the processing unit begins calculating a SPST, based on the selected variable. The processing unit does not delay beginning the SPST calculation until all required variables have been input, but rather makes predictions regarding the required variables other than the selected variable. In response to a required variable being input which invalidates a prediction made, the processing unit reinitiates the SPST calculation based on the new set of known variables and predictions for the remaining necessary variables.

The various aspects of the present invention may be more clearly understood and appreciated from a review of the following detailed description of the disclosed embodiments and by reference to the appended drawings and claims.

BRIEF DESCRIPTION OF THE DRAWINGS

State diagram FIG. 4A, and flow charts FIG. 4B and FIG. 4C, illustrate a method for calculating a best route in accordance with an exemplary embodiment of the present invention.

DETAILED DESCRIPTION

The present invention is directed to a method and system for decreasing the best-route calculation time perceived by a user of a road-mapping program by initiating the calculation in a background thread before the user has input the variables necessary to complete 1the calculation. In one embodiment, the invention is incorporated into the "MICROSOFT EXPEDIA TRIP PLANNER 98" program, which is marketed by Microsoft Corporation of Redmond, Washington. Briefly described, the "MICROSOFT EXPEDIA TRIP PLANNER 98" program is a road-mapping computer program that allows a user to calculate a best route, based on the user's driving preferences, between two or more locations in the United States. The present invention, however, is not limited to this particular embodiment of a road-mapping computer program, and can be extended to other mapping applications.

Referring now to the drawings, in which like numerals represent like elements throughout the several figures, aspects of the present invention and an exemplary operating environment will be described.

Figure 1:
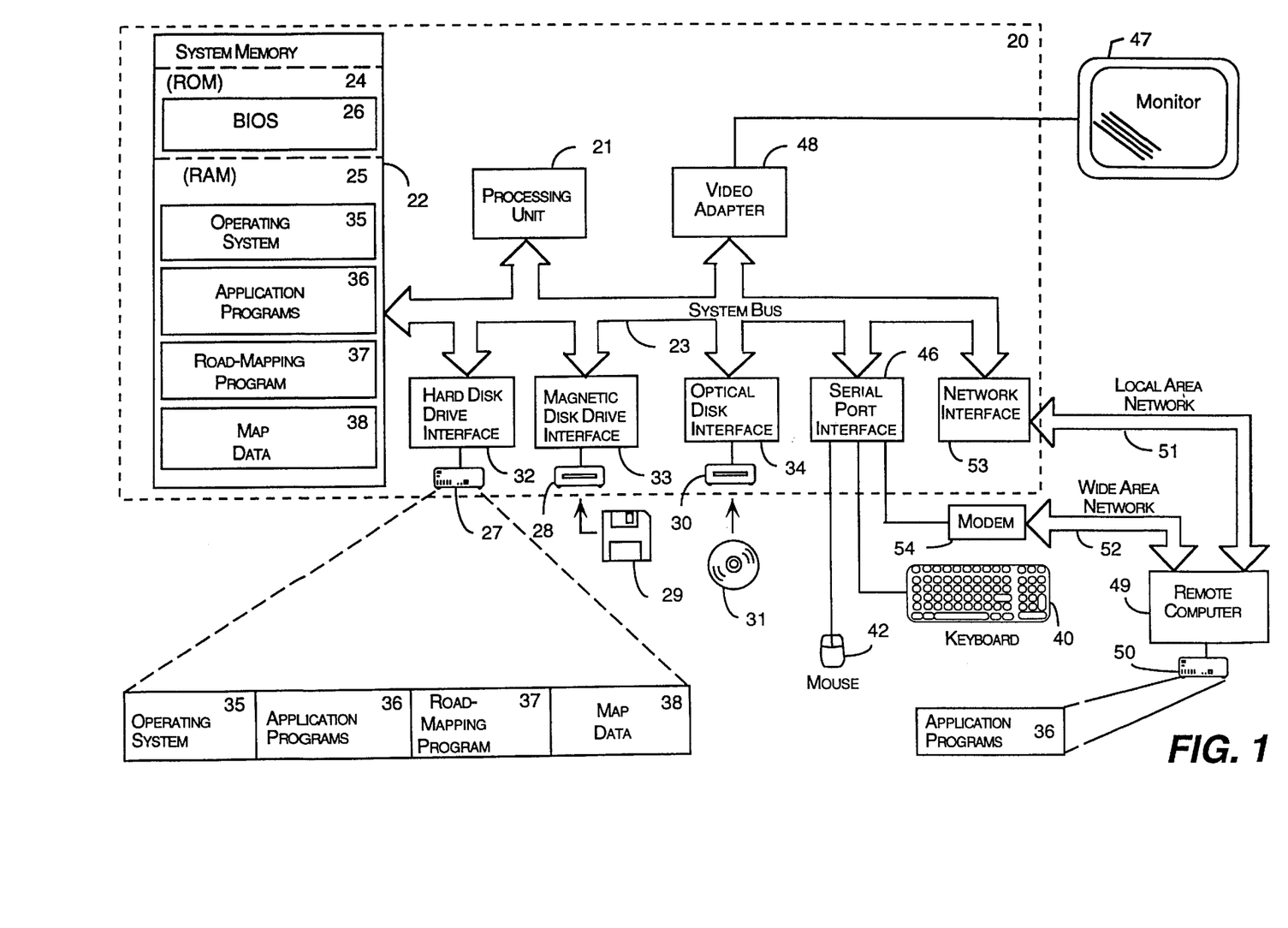
FIG. 1 is a block diagram of a personal computer that provides an exemplary operating environment for an embodiment of the present invention.

FIG. 1 and the following discussion are intended to provide a brief, general description of a suitable computing environment in which the invention may be implemented. While the invention will be described in the general context of a road-mapping program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a road-mapping program 37, which is an exemplary embodiment of the present invention, and map data 38 used by the road-mapping program 37. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, such as the Internet, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
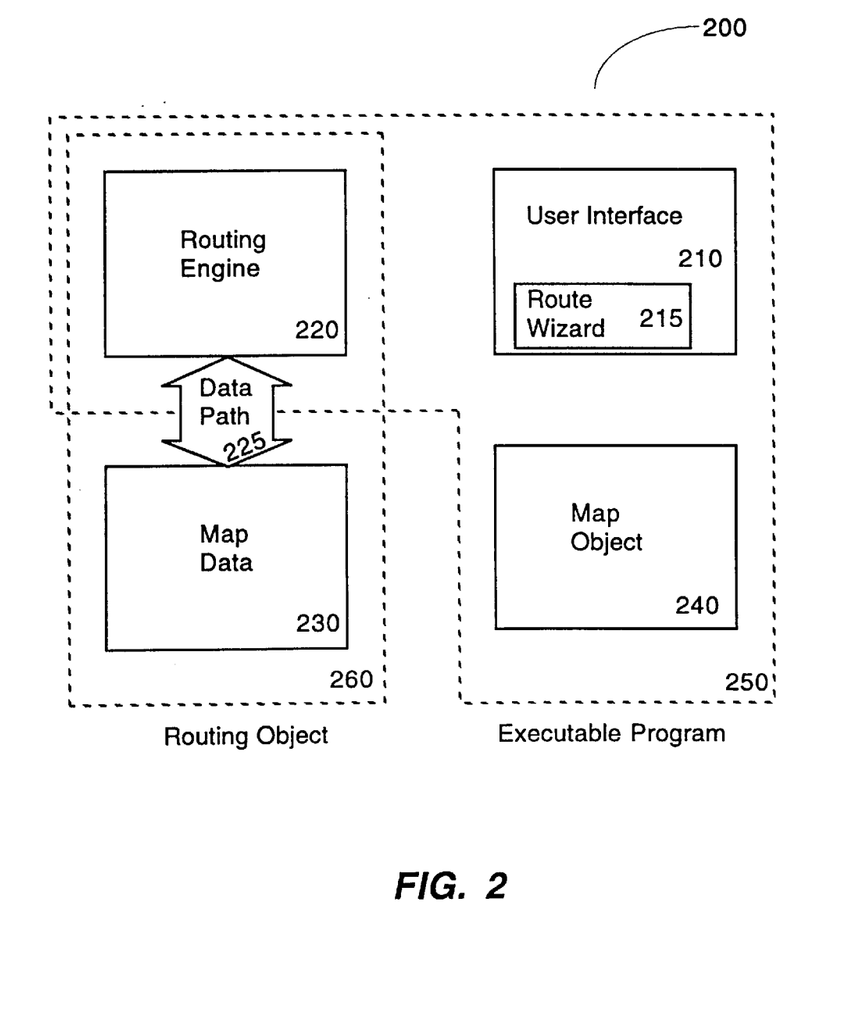
FIG. 2 is a functional block diagram illustrating the operative program modules which execute the computer instructions in accordance with an exemplary embodiment of the present invention.

The present invention can be embodied in a road-mapping program 200. FIG. 2 illustrates exemplary program modules which can be employed in a road-mapping program 200 to practice the present invention. Each program module is briefly described and discussed as it interacts with the other software modules. The exemplary program modules are the User Interface 210, the Routing Engine 220, the Map Object 240, and the Map Data 230.

The User Interface 210 creates the display screens which are depicted in FIG. 3. The User Interface 210 handles prompting the user for inputs and accepting those inputs from the user. Within the User Interface 210 is the Route Wizard 215. The Route Wizard 215 is an agent which can simplify prompting the user for the required variables. The Route Wizard 215 can create a series of display screens which prompt the user for each of the necessary variables in an intuitive simplified manner.

The Routing Engine 220 is a program module which actually performs the best-route calculation. The Routing Engine 220 is programmed with the mathematical instructions and algorithms necessary to calculate the SPST for any particular start point, and to derive the least-cost (best-route) path from that start point to any end point or end points based on the various driving scenarios which the user can define.

The Map Data 230 stores the mapping information used by the program. In the preferred embodiment, the Map Data 230 is a database containing the links and nodes which make up the directed weighted graph of the relevant geographical location, such as the United States, Europe, or the like. The Map Data 230 can be a database residing on a CD-ROM, hard drive, or other computer-readable mass-storage medium.

The Map Object 240 renders the best-route calculation results to the screen. The results can take the form of a graphical map representation of the route, a textual itinerary, both, or some other medium to convey the results to the user or make the results usable to the user, such as in database form.

Together, the Routing Engine 220, User Interface 210, and the Map Object 240 form the road-mapping executable program 250. One example of such a road-mapping executable program is the "MICROSOFT EXPEDIA TRIP PLANNER 98" program manufactured and sold by Microsoft Corporation of Redmond, Washington.

The Routing Engine 220 in conjunction with the Map Data 230, connected via a data pipe 225, form the Routing Object 260. The Executable Program 250 is envisioned to be operable with many different Map Data 230 modules. For instance, the Map Data 230 can comprise airline schedules, train schedules, ferry schedules, or any other information which lends itself to the weighted-directed-graph format or weighted-graph format.

Functionally speaking, once the Executable Program 250 is initiated, the User Interface 210 prompts the user to use the Route Wizard 215, or some other feature which might be included in the Executable Program 250. The User Interface 210 module prepares the display screens, user prompts, help screens, and other mechanisms for the user to interface with the program. Once the user provides the User Interface 210 with an input, the User Interface 210 submits that input to the appropriate other program module.

The User Interface 210 submits the user input to the Routing Engine 220 if it is relevant to the best-route calculation. The Routing Engine 220 will perform an appropriate task dependent upon which user input it receives. When it receives the start point from the User Interface 210, the Routing Engine 220 immediately begins calculating the SPST for that start point location. The Routing Engine 220 can receive any of the SPST-calculation-relevant inputs from the User Interface 210 before receiving the start point. If the User Interface 210 provides a relevant input other than the start point, the Routing Engine 220 will store the relevant input for use in calculating the SPST. Any relevant inputs provided before the SPST calculation begins will eliminate corresponding predictions which must be made.

Calculating the SPST involves computing a path in a weighted graph connecting two given vertices (or locations), with the property that the sum of the weights of all the links (or roads) is minimized over all such paths. Briefly, the SPST can be calculated with a variant of a well-known Minimum Spanning Tree ("MST") algorithm, attributed to E. Dijkstra. To construct the SPST for a given point in a directed weighted graph, the calculation begins with a single vertex (the starting point) and always taking next the vertex "closest" to the vertices already taken. For the purpose of this discussion, "closest" means the vertex connected by the link with the least cost. For a more detailed discussion of Minimum Spanning Trees, Shortest-Path Spanning Trees, the Dijkstra algorithm, and directed weighted graphs generally, see Robert Sedgewick, Algorithms in C (1990 Addison-Wesley Pub. Co.).

Once the Routing Engine 220 begins the SPST calculation, it retrieves the necessary link and node information from the Map Data 230. As mentioned, the Map Data 230 can contain all of the data necessary to perform the SPST calculation. In an exemplary embodiment, the data takes the form of a weighted-directed-graph database. The weights assigned to the nodes and links within the Map Data 230 depend on particular user-defined factors, such as the speed at which the user likes to drive, and the like. Therefore, the Routing Engine 220 provides values for each of the variables for which it requests information from the Map Data 230.

The information that the Routing Engine 220 receives from the Map Data 230 will be based on a combination of predictions and accurate values, depending upon which of the variables have been input to the Executable Program 250 by the user. As will be obvious to those skilled in the art, if the only value that the user has input is the start point, the Routing Engine 220 will substitute predictions for all of the other necessary variables. As the user submits actual values for those predictions, the Routing Engine 220 will either restart the calculation if the prediction was false, or continue calculating if the prediction holds true.

Once all of the variables necessary for the calculation have been provided by the user, the Routing Engine 220 completes the best route calculation. Those skilled in the art will appreciate that the road-mapping program 200 could prepare the best route based on only two variables, the start point and the end point, by not providing the ability to define a route type. However, most users desire the flexibility associated with defining a route type, or other such variables. The present invention is not limited to an embodiment which requires more than the minimum variables necessary to calculate a route from one location to another location.

Once the calculation is complete, the Routing Engine 220 prepares the best-route from the start point to the end point, and forwards the results to the Map Object 240. The Map Object 240 puts the results in a usable form. For instance, the results can be presented to the user in the form of a textual itinerary, a graphical display of the route or some other usable form. It will be apparent to those skilled in the art that the results of the best-route calculation need not be actually displayed to the user. The results could take the form of information stored in a database accessible by the user, or any other usable form.

FIG. 3, comprising FIGS. 3A–3J, illustrates a sequence of screen displays that depict an exemplary road-mapping computer program embodying the present invention. In the screen display 300 shown in FIG. 3A, a user has initiated a session with an exemplary road-mapping program embodying the present invention. The user is first prompted with a start-up screen 312 presenting several choices. The start-up screen 312 of this exemplary embodiment offers the user the choices of planning a route, finding a particular location on the map, viewing a travel guide, or revisiting a previously-saved session.

Figure 3A:
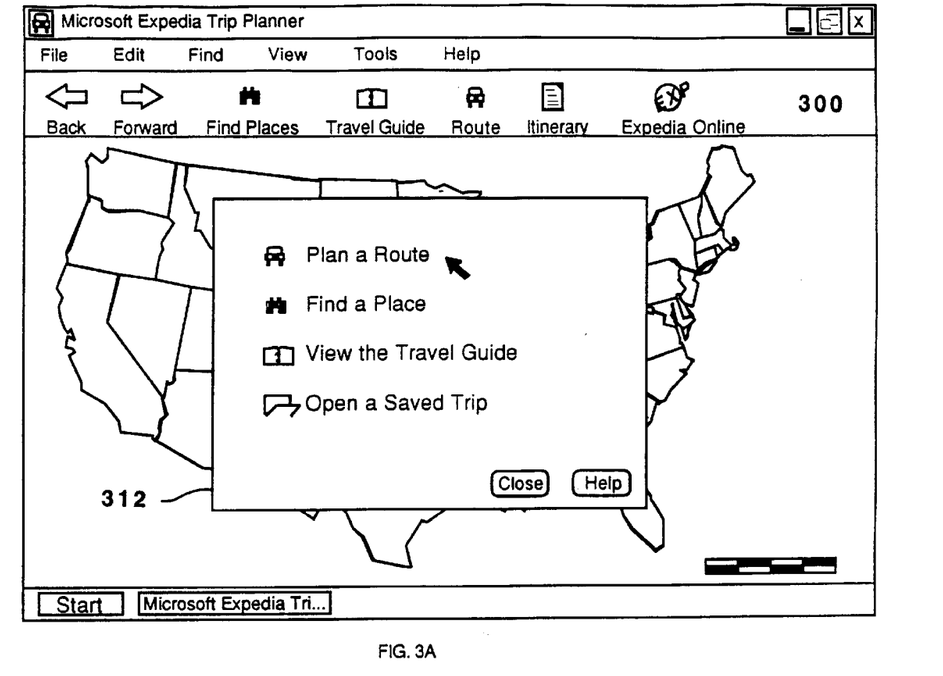
FIGS. 3A–3J, illustrate a sequence of screen displays depicting a method for calculating a best route in accordance with an exemplary embodiment of the present invention.
Figure 3B:
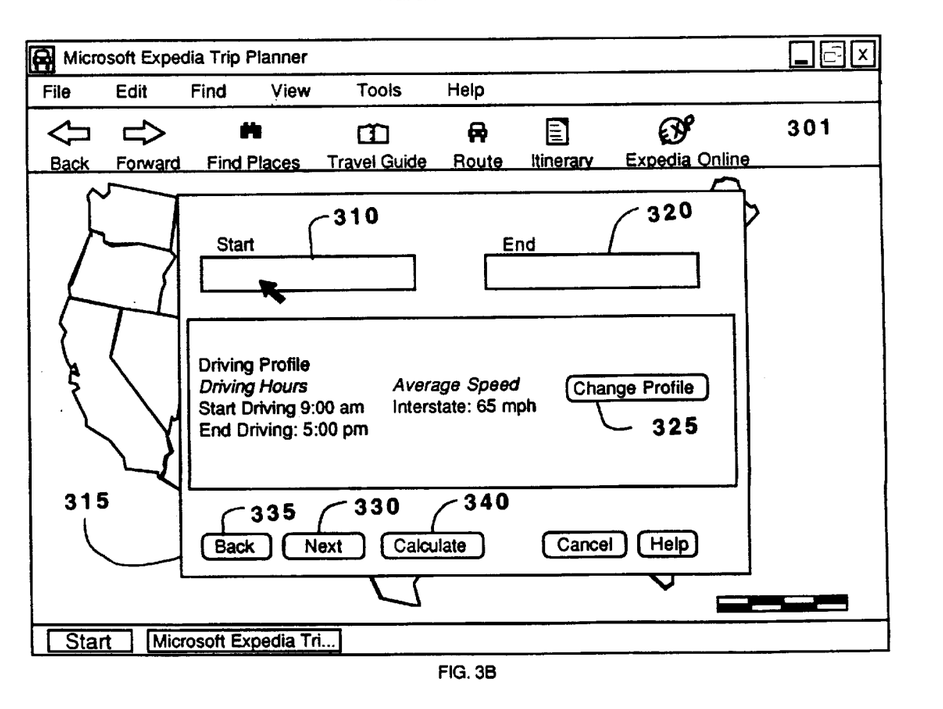

In the screen display 301 shown in FIG. 3B, the user has chosen to plan a route. This results in the screen display 301 changing from the start-up screen 312 to a first input screen. Those skilled in the art will appreciate that the first input screen can take the form of a "Route Wizard" 315, which is a user interface designed to simplify the interaction of the user with the program by presenting intuitive input fields in a logical fashion, and limited in number to those absolutely necessary. The Route Wizard 315 has a start point entry field 310 and an end point entry field 320. The Route Wizard 315 also provides buttons which allow the user to change a driving profile 325, proceed to the next screen 330, return to the previous screen 335, or begin the calculation 340. Other buttons may also be provided for the other functions of the road-mapping program.

The Route Wizard 315 invites the user to enter a start point and an end point. To help direct the chronology of the user's inputs, the program locates the insertion point in the start point entry field 310 by default. This increases the likelihood that the user will enter the start point first, thereby maximizing the benefits of the present invention. The exemplary embodiment of the present invention does not initiate the SPST calculation upon the entry of the end point. Accordingly, if the user inputs the end point first and the start point last, the exemplary embodiment will not result in a substantial perceived time savings over the prior method of waiting for all of the user inputs. Fortunately, most users think logically, meaning from start to finish, and will succumb to the suggestion of the Route Wizard 315 and input the start point first.

However, those skilled in the art will appreciate that the SPST can be calculated from the start point or the end point. Therefore, the present invention encompasses initiating the best-route calculation at any instance prior to the user's final input, and should not be interpreted as limited to initiating the SPST calculation upon entry of the start point.

Figure 3C:
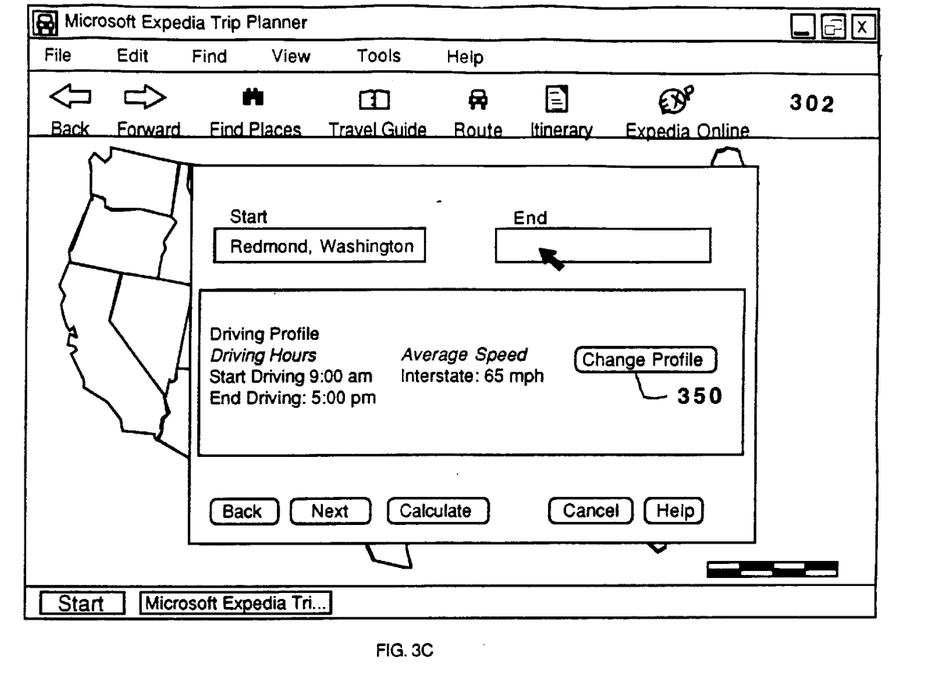

In FIG. 3C, in display screen 302, the user has input Redmond, Washington as a start point for a journey. At that instance, the exemplary embodiment begins calculating the SPST with Redmond as the start point. As mentioned above, calculating the SPST is the same regardless of the end point. Therefore, the SPST calculation is initiated in a background thread, or worker thread, as soon as the start point is received. By making use of modern multithreaded operating systems, the present invention is able to calculate the SPST in the background without preventing the user from accessing the other features of the program.

To begin calculating, predictions concerning the user's preferences should be made. The weights assigned to each road used in the SPST calculation can vary in relation to several user-defined variables. For instance, one embodiment can allow the user to input a preferred travel speed for various road-types, the preferred times of the day the user likes to drive, the preferred road-types, and the like. A different SPST could result depending on which of those preferences the user modifies. The present invention begins calculating a SPST by predicting values for each of the relevant variables. For example, typically, a user will select the quickest route between the start point and the end point, rather than the most scenic or the shortest. Therefore, the exemplary embodiment predicts that the user will choose the quickest route, and begins calculating the SPST based on the assigned road weights for the quickest route. The present invention predicts values for each of the variables which affect the SPST calculation. If one of those predictions later proves invalid, then the calculation is restarted when the user inputs the actual value of the variable. Or, if the actual value of the variable is input before the start point, then, of course, the actual value is used.

Although the exemplary embodiment of the present invention waits to begin the SPST calculation until it receives the actual start point, those skilled in the art will appreciate that the SPST calculation could be started even sooner by predicting a start point. Many computer programs today allow the user to define default user preferences which are stored and available to the program at start-up. Those default user preferences are often established when the program is first installed on the computer. By allowing the user to define a default start point, the SPST calculation can be initiated immediately at start-up by predicting that the user will accept the default start point. In this manner, the SPST calculation could begin before any user input, aside from the user providing the default value.

Figure 3D:
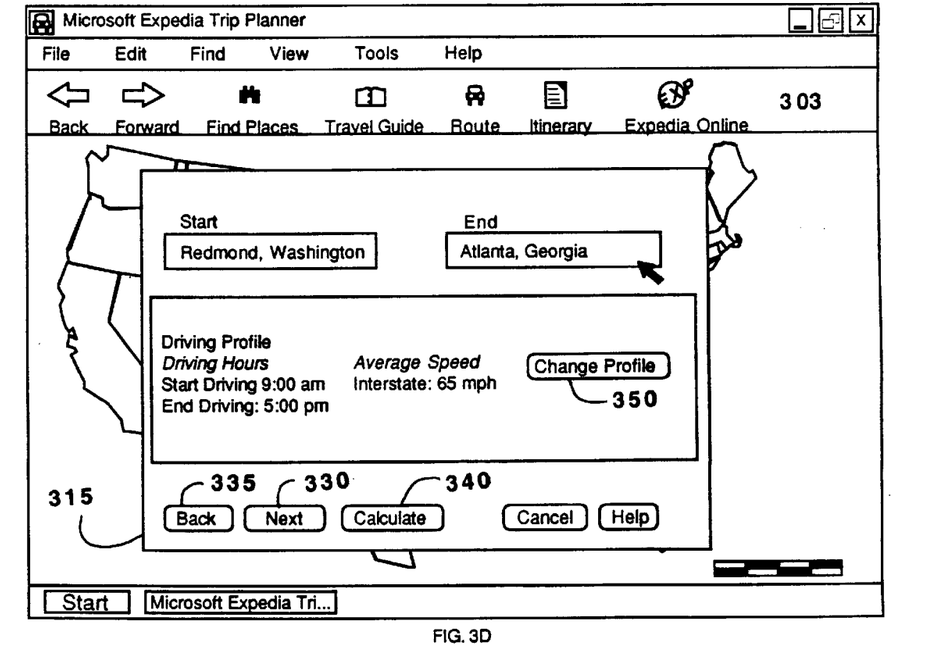

In FIG. 3D, in display screen 303, the user has input an end point for the journey. Once the end point is known, the SPST calculation can be tested to determine if the end point is already within the SPST calculated. If so, then the calculation is suspended, awaiting input of the remaining variables. At this point, the user may initiate the best-route calculation, or change the driving profile variables.

Figure 3E:
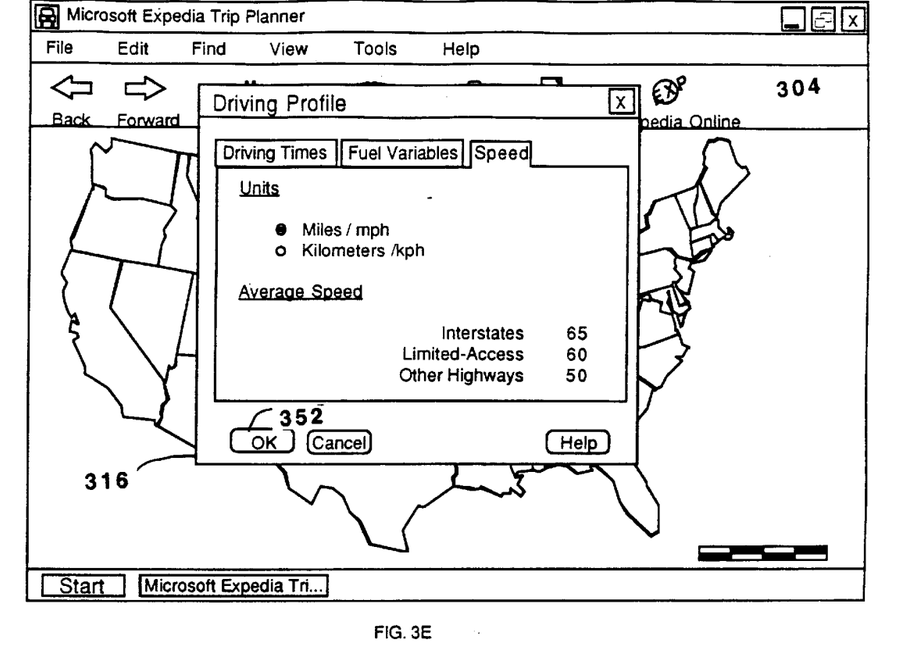

If the user selects the Change Profile button 350, as depicted in FIG. 3E, for display screen 304, the user can review and modify the driving profile. The user can change many driving-profile variables that can affect the journey. However, all of the variables do not necessarily affect the SPST calculation. For instance, if the user changes a fuel consumption variable, the SPST already calculated will not be affected. However, if the user changes the preferred speed he likes to drive, the SPST calculation will be affected. When finished modifying the driving profile, the user selects OK 352 and returns to the Route Wizard 315.

Returning to FIG. 3D, if the user chooses not to modify the driving profile, from the Route Wizard 315 the user can either choose Next 330 and continue providing inputs, the user can select Calculate 340, or the user can select Back 335. The user can select Back 335 to go to any previous step and make changes to the already-selected variables. If the user selects Back 335 to change a variable, the SPST calculation can be affected just as if the user had made a change to the variable in the first instance. If the user selects Back 335 and makes a change which invalidates the SPST calculation, the exemplary embodiment will reinitiate the SPST calculation just as if the user had made the change in the first instance. On the other hand, selecting Calculate 340 from the Route Wizard 315 immediately validates the predictions made for the SPST calculation, and the best-route calculation is finalized without additional input from the user.

Figure 3F:
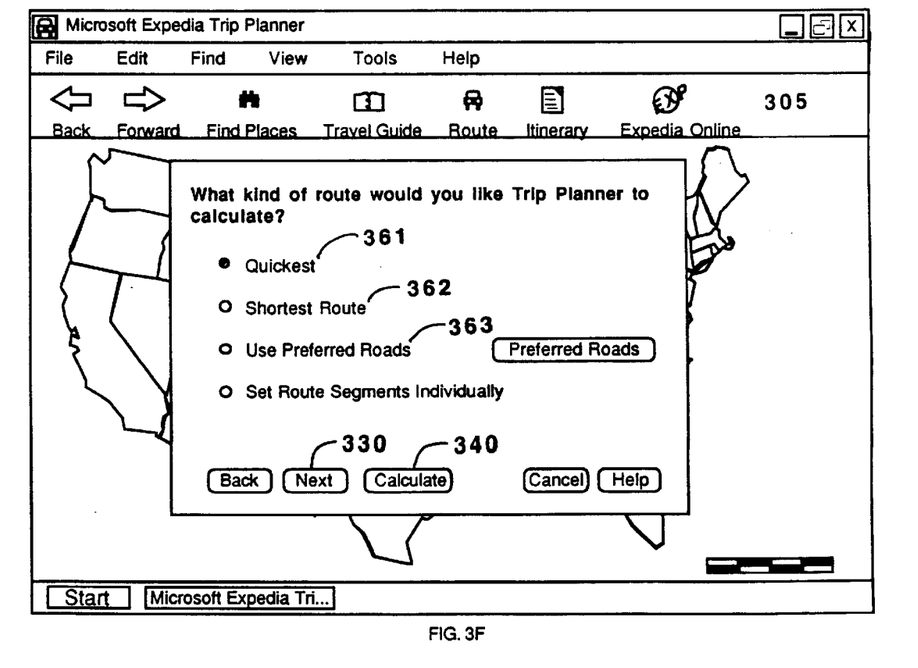

In a display screen 305 shown in FIG. 3F, the user has selected Next 330, and the Route Wizard 315 presents choices concerning the kind of route the user prefers. Available are the quickest route 361, shortest route 362, or a route dependent upon the user's preferences for the type of road 363, i.e. scenic roads, Interstates, highways, etc. These selections can affect the SPST calculation. Therefore, if the user changes the selection from the quickest route 361 to any other selection, the present invention will immediately restart the SPST calculation based upon the user's new preference. However, if the user does not change the selection, the SPST calculation which has already begun will be valid. When finished choosing the route type, the user selects Calculate 340, and the program finishes calculating the SPST, and then prepares the best route and itinerary for the user to review.

Figure 3G:
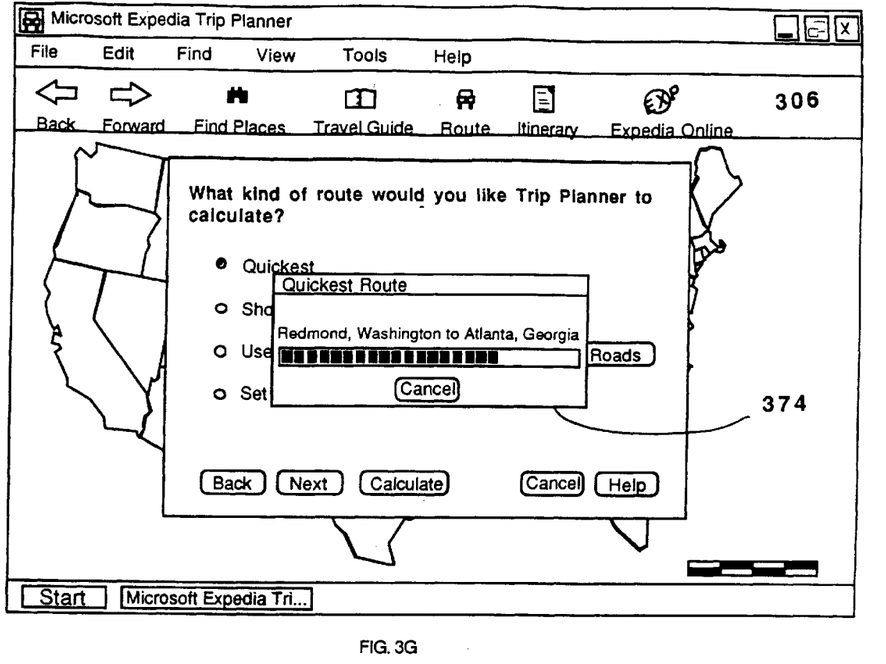

In a display screen 306 shown in FIG. 3G, the user has clicked Calculate 340 and the program is completing the best-route calculation. While the calculation is completing, the user is shown a graphical progress bar 374 representing the progress of the calculation. As the calculation progresses, the progress bar 374 grows from left to right. Often, because the calculation is already nearly complete, the user will be presented with a progress bar 374 almost fully complete.

Figure 3H:
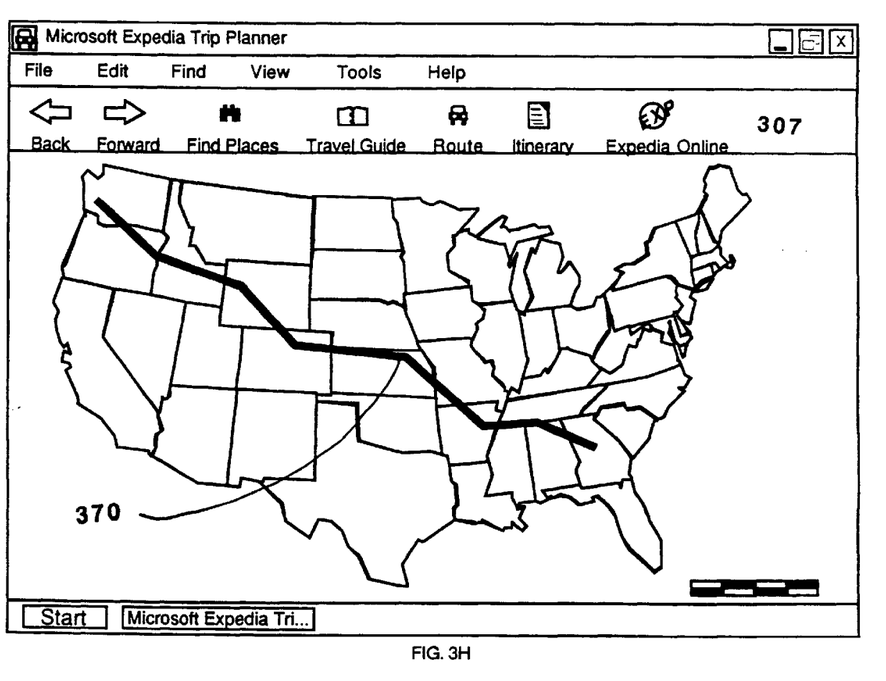
Figure 3I:
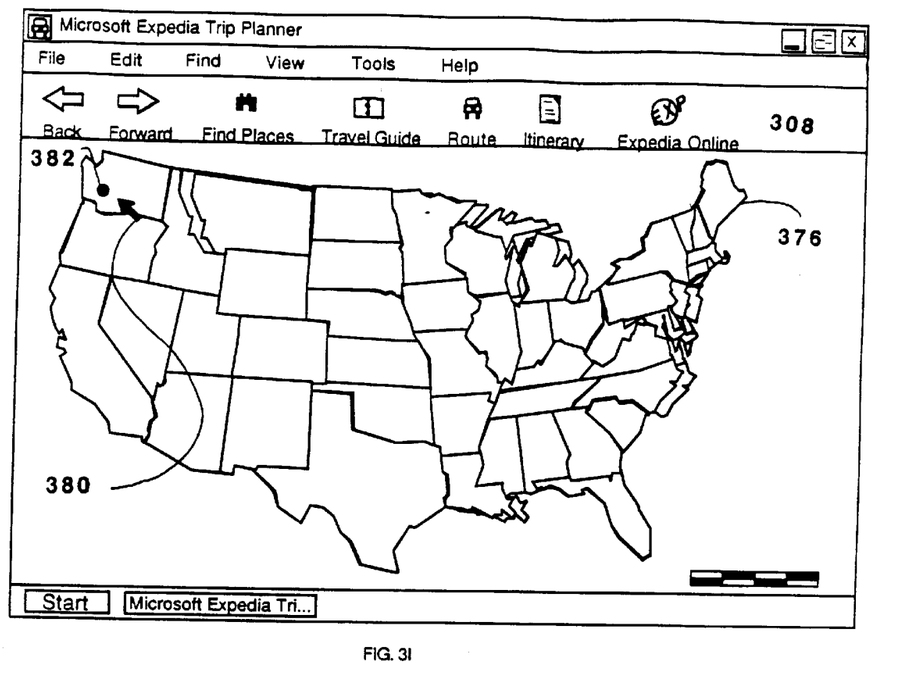

In a display screen 307 shown in FIG. 3H, the calculation is complete, and the user is presented with a graphical illustration of the route displayed on a map. A textual itinerary providing written directions from the start point to the end point can also be displayed (not shown). Those skilled in the art will appreciate that the present invention can give the user the perception that the calculation was completed in less time than it actually was. The user will have the results of the calculation in less time from selecting the Calculate 340 button than in prior art systems, which typically do not begin the calculation until the user selects Calculate 340.

Although the invention, has been described with reference to a Route Wizard 315, alternative embodiments will become apparent to those skilled in the art. For instance, in FIG. 3I, the user is presented with a display screen 308 showing a graphical representation of a map 376. This embodiment allows the user to navigate an input device 380, such as a computer mouse, to the user's desired starting location for the journey 382. When the user selects that location, the invention immediately begins the SPST calculation based on the selected starting point 382.

Figure 3J:
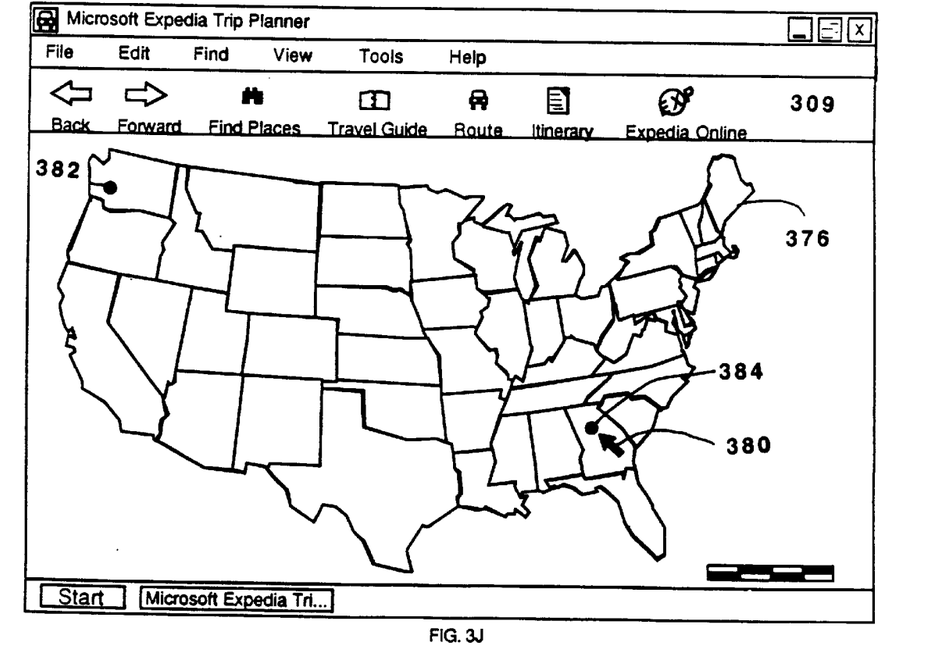

In a display screen 309 shown in FIG. 3J, the user navigates the input device 380 to the user's desired ending point 384. The user selects the ending point, and the best-route calculation is completed based on the selected end point 384. It will be apparent to those skilled in the art that this alternative embodiment can finish the best-route calculation based on the user-selected starting and ending points, and further based on the last route-type selected by the user, a user-defined preferences file, or other manner of automatically identifying the route type. In this manner, only two inputs are required from the user to calculate the best route. Alternatively, the user can be prompted with a dialog box, similar to the dialog box illustrated in FIG. 3F, in response to the user's end point 384 selection, and allow the user to manually select a route type.

Figure 4A:
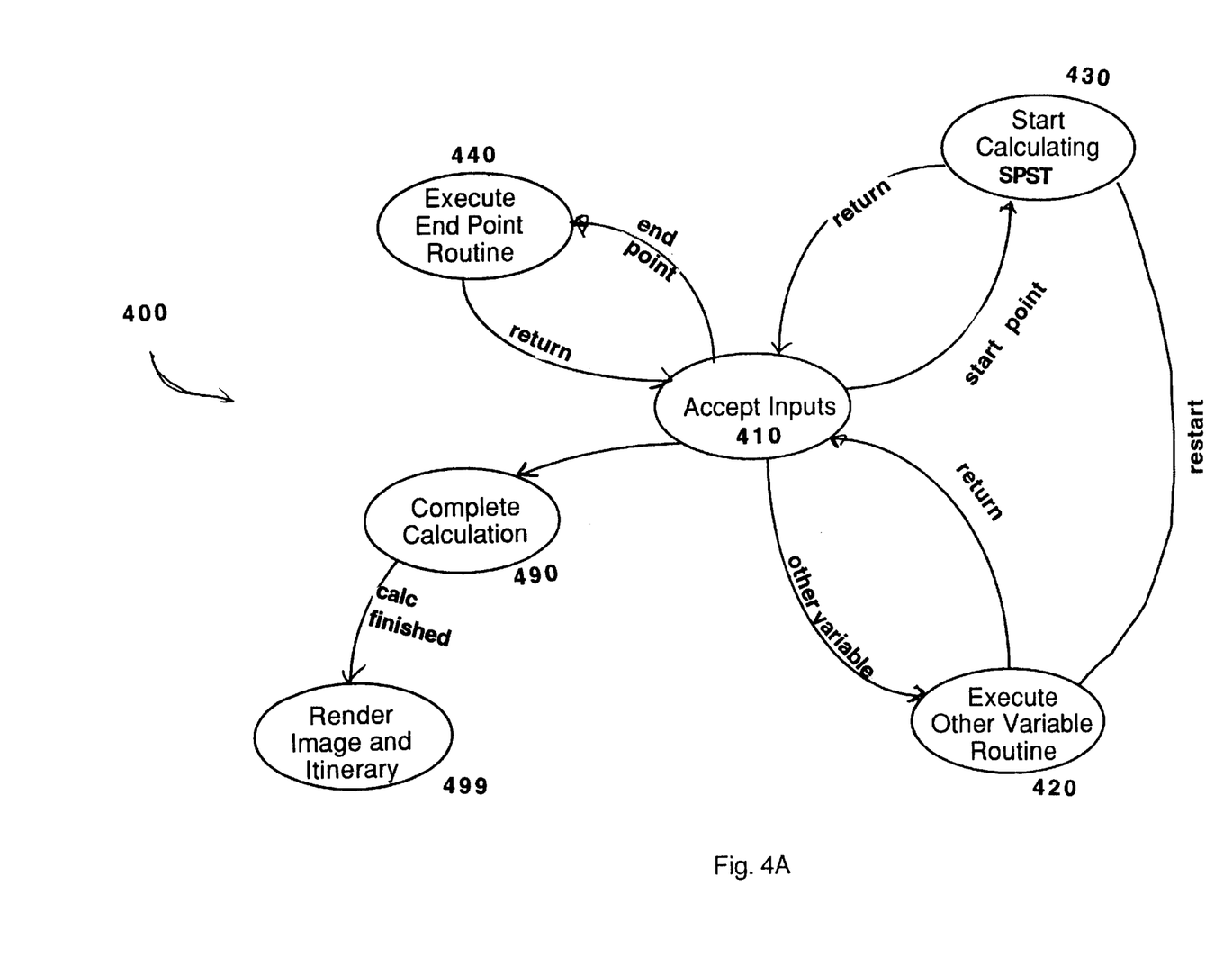
Figure 4B:
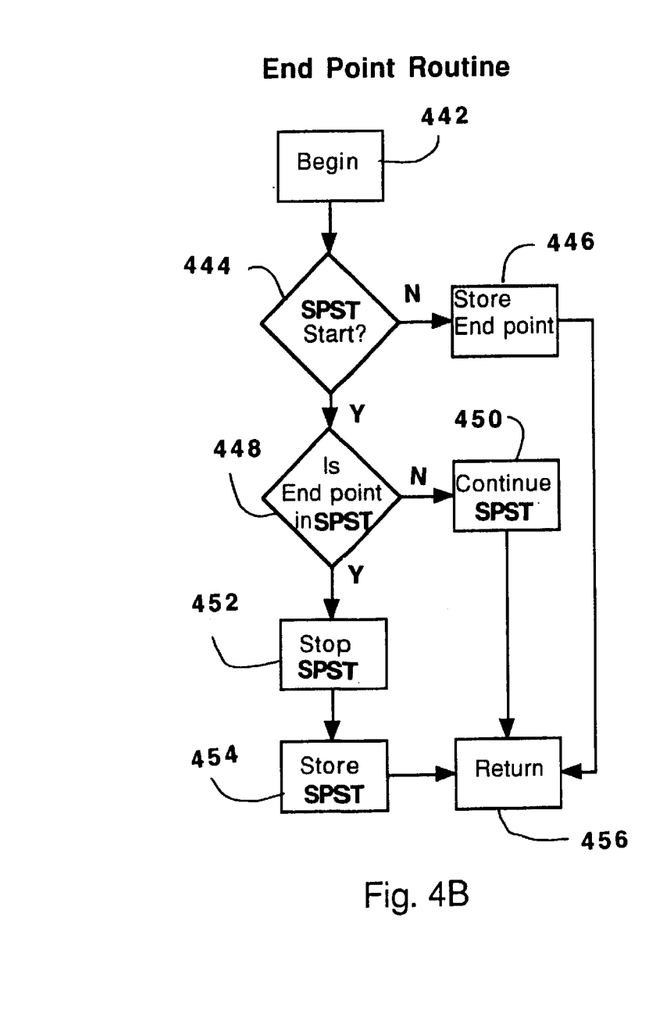
Figure 4C:
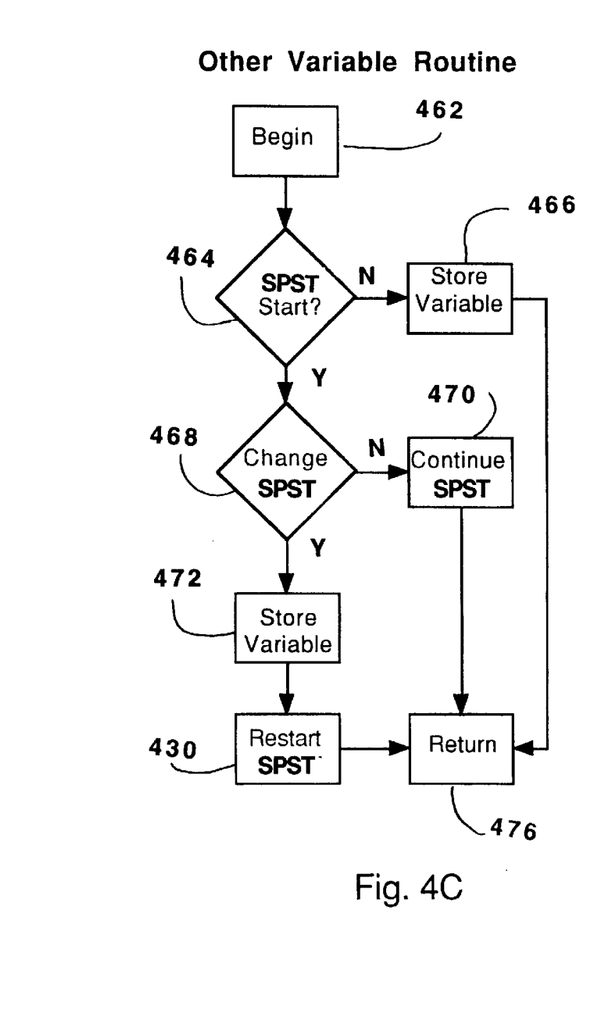

FIG. 4, which consists of a state diagram FIG. 4A, and flow charts FIG. 4B and FIG. 4C, illustrates an exemplary method 400 for calculating a best-route, which gives the user the perception that the calculation was completed in a shorter time than it actually was. Those skilled in the art will appreciate that the process described by the state diagram of FIG. 4 is executed by the processing unit 21 (FIG. 1) in response to instructions that have been incorporated into various program modules (FIG. 2), including the operating system, road-mapping executable, etc.

The method 400 begins at the idle state 410. The term "idle" means that the road-mapping program is available for user input, but has not yet received any. The idle state could correspond to the Route Wizard 315 input screen of the preferred embodiment described above. Those skilled in the art will appreciate that the road-mapping program may be involved in a variety of other activities associated with computerized mapping, etc., and still be "idle" for purposes of this discussion.

Those skilled in the art will appreciate that the method can proceed from the idle state 410 to state 420, state 430, or state 440 in any order, and that the user need not provide the start point first. As was illustrated in FIG. 3, the user can provide the inputs in any order.

When the user inputs a start point, the method proceeds to state 430. At state 430, the program accepts the start point, and begins calculating the SPST in a worker thread. The calculation makes any predictions necessary to proceed with the calculation. Predictions which can be made include the route type, the speed at which the driver likes to drive, and the like. The method only makes predictions for those variables that have not yet been input. Once the SPST calculation is initiated, the method returns to the idle state 410 and awaits the next user input.

When the user enters an end point, the method proceeds to state 440 and initiates an "End Point Routine," described in a flow chart illustrated in FIG. 4B. Turning now to FIG. 4B, the method enters the flow chart at the beginning block 442. At decision block 444, the method tests whether the SPST calculation has begun. If the start point has not yet been entered, the SPST calculation will not yet have started, so the method will proceed to block 446. At block 446, the method stores the end point for use when the SPST calculation begins. In this manner, the method will terminate the SPST calculation once it includes the end point, rather than calculating the SPST from the start point to all other points. The method then proceeds to block 456, which returns the method to the idle state 410.

At block 444, if the SPST calculation has already begun, the method proceeds to decision block 448, which tests to see if the SPST already calculated includes the end point. At block 450, the method determines that the end point was not in the SPST, stores the end point for use in the SPST calculation, and continues calculating the SPST. The method then continues to block 456, which returns the method to the idle state 410.

At block 448, if the end point is contained in the SPST already calculated, the method proceeds to block 452. At block 452, the method stops the SPST calculation because it contains sufficient information to complete the best-route calculation, and proceeds to block 454. At block 454, the method stores the SPST for use in completing the best-route calculation, and then proceeds to block 456 which returns the method to idle state 410.

Turning back to FIG. 4A, from the idle state 410, if the user inputs a variable other than the start point or the end point, such as a change to the driving profile, the method proceeds to state 420. At state 420, the method executes an "Other Variable Routine" illustrated in a flow chart shown in FIG. 4C.

FIG. 4C is a flow chart of the decision making steps performed if the user inputs a variable other than a start point or an end point, such as a change to the driving profile. The method enters at beginning block 462. The method proceeds to decision block 464 which tests to determine if the SPST calculation has started. If the calculation has not begun, the method simply stores the variable at block 466 for use when the calculation does begin. It will be apparent to those skilled in the art that storing the variables which have been provided before the calculation begins eliminates the need to make a prediction for that variable. Once the variable is stored, the method proceeds to block 476, which returns to the idle state 410.

From decision block 464, if the SPST calculation has already begun, the method will proceed to decision block 468, which will determine whether the particular variable input affects the SPST calculation. As mentioned above, the user may enter several different variables, only some of which will affect the SPST calculation. Therefore, if the variable input does not affect the SPST calculation, then the method, at block 470, continues computing the SPST without change, and then, at block 476, returns to the idle state 410.

If the variable supplied does affect the SPST, meaning that the SPST being calculated is based on an erroneous prediction, then, the method proceeds to block 472 and stores the variable for use in calculating the proper SPST. Then the method proceeds to block 474 (corresponding to state 430 of FIG. 4A) and restarts the SPST calculation. It will again be apparent to those skilled in the art that storing the variable will eliminate the need to predict a value for that variable when the SPST calculation is reinitiated. Once the SPST calculation has been restarted at state 430, the method returns to the idle state 410.

Returning to the state diagram shown in FIG. 4A, from the idle state 410, if the user inputs a calculate command, the method moves to the finish calculation state 490 and completes the best-route calculation. In an exemplary embodiment, when the method enters the finish calculation state 490, the user is presented with a graphical progress meter, as depicted in FIG. 3G.

Once complete, the method moves to the present results state 499, at which the user is presented with the results of the best-route calculation. Those skilled in the art will appreciate that the results can take the form of a textual itinerary detailing the travel route, a graphical map with the travel route highlighted, some combination of both textual and graphical displays, or any other process for making the results known or usable to the user.

To summarize, the present invention begins a best-route calculation in a worker thread before the user inputs the variables necessary to complete the calculation. The invention can prompt a user for various inputs relating to a best-route calculation. In response to the input of a selected variable, the invention begins calculating a SPST, based on the selected variable. The invention does not delay beginning the SPST calculation until all required variables have been input, but rather makes predictions regarding the required variables other than the selected variable. In response to a required variable being input which invalidates a prediction made, the invention reinitiates the SPST calculation based on the new set of known variables and predictions for the remaining necessary variables. When the best-route calculation is complete, the invention can display the results in either a graphical format, textual format, or both.

The present invention results in a shortened perceived-calculation time to the user. With much of the calculation already complete when the user instructs the program to calculate, the wait time for the user is shortened.

The present invention may conveniently be implemented in one or more program modules that are based upon the diagrams of FIG. 4, and the features illustrated in FIG. 2. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the invention was described in the context of a computerized road-mapping program, those skilled in the art will appreciate that the invention is also applicable to other routing programs, such as airline routing, train routing, and the like. Similarly, the invention may be applied to initiate the best-route calculation at any point prior to receiving the final input from the user, such as at start-up, when the user inputs both the start point and the route type, or some other time prior to receiving all of the user inputs.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for calculating a best-route from one location to another location, the best-route calculation based on a plurality of variables, the method comprising the steps of:
    (a) initiating the best-route calculation based on a predicted value for a first variable in the plurality of variables;
    (b) receiving a user-input value corresponding to the predicted value and verifying that the predicted value for the first variable is correct by comparing the predicted value to the user-input value;
    (c) continuing the best-route calculation if the predicted value for the first variable is correct; and
    (d) reinitiating the best-route calculation if the predicted value for the first variable is incorrect.

2. The method of claim 1, wherein the initiating step further comprises assigning a predetermined value to the first variable.

3. The method of claim 2, wherein the predetermined value is a route-type.

4. The method of claim 2, wherein the predetermined value is a stored value maintained in a preferences file comprising values provided by a user, the stored value being a start point of a journey.

5. The method of claim 1, wherein the initiating step further comprises:
    (i) accepting a first input; and
    (ii) initiating the best-route calculation, in a background thread, with the first input as one of the variables in the best-route calculation, and the predicted value as another one of the variables in the best-route calculation.

6. The method of claim 5, wherein the first input is a starting location of a journey.

7. The method of claim 5, wherein the first input is an end point of a journey, and the predicted value is a route type.

8. The method of claim 5, wherein the initiating step comprises initiating a Shortest-Path Spanning Tree calculation in a background thread.

9. The method of claim 1, wherein the verifying step further comprises:
    (i) accepting a second input;
    (ii) comparing the second input to the predicted value;
    (iii) returning a value of "correct" if the second input matches the predicted value; and
    (iv) returning a value of "incorrect" if the second input does not match the predicted value.

10. The method of claim 9, wherein the second input is a route-type value.

11. The method of claim 9, wherein the reinitiating step further comprises the steps of:
    (i) terminating the best-route calculation;
    (ii) storing the results of the terminated best-route calculation;
    (iii) substituting the second input for the predicted value in the best-route calculation; and
    (iv) restarting the best-route calculation.

12. A computer-readable medium having computer-executable instructions for calculating a best route between two locations, comprising the steps of:
    (a) initiating the best-route calculation based on a predicted value for a first variable in the plurality of variables:
    (b) receiving a first user-input value corresponding to the predicted value and verifying that the predicted value for the first variable is correct by comparing the predicted value to the user-input value; and
    (c) continuing the best-route calculation if the predicted value for the first variable is correct.

13. The computer-readable medium of claim 12, further comprising computer-executable instructions for performing the steps of:
    (d) receiving a second input;
    (e) determining if the best-route calculation has progressed to include the second input;
    (f) terminating the best-route calculation if the second user input is within the results of the current best-route calculation;
    (g) continuing the best-route calculation until it reaches the second user input, and then terminating the best-route calculation.

14. The computer-readable medium of claim 12, further comprising computer-executable instructions for performing the step of:
    (d) reinitiating the best-route calculation if the predicted value is incorrect.

15. A computer-readable medium on which is stored a computer program for calculating a best-route from one location to another location, the best-route calculation being based on a plurality of variables, the computer program comprising instructions which, when executed, perform the steps of:
    (a) accepting a first user input;
    (a) predicting a value for at least a first one of the plurality of variables;
    (b) initiating the best-route calculation, in background thread, based on the user input and the predicted value;
    (c) receiving a user-input value corresponding to the predicted value and verifying that the predicted value for the first variable is correct by comparing the predicted value to the user-input value;
    (d) continuing the best-route calculation if the predicted value is correct; and
    (e) reinitiating the best-route calculation if the predicted value is incorrect.

16. The computer-readable medium of claim 15, wherein the verifying step further comprises:
    (i) accepting a second input from the user
    (ii) comparing the second input from the user to the predicted value.

17. The computer-readable medium of claim 16, wherein the reinitiating step further comprises:
    (i) storing the current results of the best-route calculation in memory;

(ii) restarting the best-route calculation based on the first user input and the second user input.

18. A computer-readable medium having computer-executable modules, comprising:
   (a) a first program module for accepting a group of user inputs, the group of user inputs including at least a start point;
   (b) a second program module for calculating a best-route between two locations, by performing the steps of:
      (i) initiating the best-route calculation in a background thread based on at least one predicted value;
      (ii) verifying that the predicted value is correct, by performing the steps of:
         a. receiving a second user input in the group of user inputs from the first program module, the second user input corresponding to a route-type;
         b. verifying that the second user input matches the predicted value;
         c. continuing the best-route calculation if the second user input matches the predicted value;
         d. if the second user input does not match the predicted value, storing the current results of the best-route calculation and restarting the best-route calculation based on the second user input.
   (c) a third program module containing information upon which the best-route calculation operates.

19. The computer-readable medium of claim 18, wherein the first program module is a user interface which allows the user to provide inputs in response to the user interface prompting the user for the inputs.

20. The computer-readable medium of claim 19, wherein the user interface is a Route Wizard.

21. The computer-readable medium of claim 18, wherein the first program module is a user interface which allows the user to navigate a pointer controlled by an input device to a location in the user interface and select the location as an input.

22. The computer-readable medium of claim 18, wherein the third program module comprises a directed weighted graph.

* * * * *